(12) United States Patent
Kamishiro

(10) Patent No.: US 9,319,550 B2
(45) Date of Patent: Apr. 19, 2016

(54) APPARATUS, USE LIMITING METHOD, AND STORAGE MEDIUM

(71) Applicant: Daisuke Kamishiro, Kanagawa (JP)

(72) Inventor: Daisuke Kamishiro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/259,214

(22) Filed: Apr. 23, 2014

(65) Prior Publication Data

US 2014/0327922 A1   Nov. 6, 2014

(30) Foreign Application Priority Data

May 2, 2013    (JP) .................. 2013-096853
Feb. 27, 2014  (JP) .................. 2014-037010

(51) Int. Cl.
  *G06F 15/00*   (2006.01)
  *H04N 1/00*    (2006.01)
  *G06F 3/12*    (2006.01)

(52) U.S. Cl.
  CPC .......... *H04N 1/00875* (2013.01); *G06F 3/1219* (2013.01); *G06F 3/1239* (2013.01); *G06F 3/1285* (2013.01); *H04N 1/00244* (2013.01); *H04N 1/00925* (2013.01); *H04N 2201/0094* (2013.01); *H04N 2201/3205* (2013.01); *H04N 2201/3276* (2013.01); *H04N 2201/33314* (2013.01)

(58) Field of Classification Search
  CPC ................ G06F 3/1239; H04N 2201/3276; H04N 2201/3205
  USPC .......................................... 358/1.13
  See application file for complete search history.

(56) References Cited

U.S. PATENT DOCUMENTS

2006/0262344 A1*  11/2006  Matsuda ............... G06F 3/1207
                                                         358/1.15
2009/0059267 A1*   3/2009  Sato .................. H04N 1/00222
                                                         358/1.14

FOREIGN PATENT DOCUMENTS

JP   2011-197830   10/2011
JP   2014-046457    3/2014

\* cited by examiner

*Primary Examiner* — Saeid Ebrahimi Dehkordy
(74) *Attorney, Agent, or Firm* — IPUSA, PLLC

(57) ABSTRACT

An apparatus includes a reading unit that reads a first value indicating usage of the apparatus from a portable storage medium, a use limiting unit that updates the first value according to use of the apparatus and limits use of the apparatus when the updated first value reaches a predetermined value, and a writing unit that writes the updated first value into the portable storage medium.

15 Claims, 15 Drawing Sheets

FIG.4

| USER NAME | PASSWORD | RIGHT | CARD ID |
|---|---|---|---|
| A | Hoge | FULL COLOR, MONOCHROME | qwertyuiop |
| B | Abc | MONOCHROME | asdfghjkl |
| C | pass | MONOCHROME | zxcvbnm |

| COPY | MONOCHROME | SIMPLEX | A4 | PLAIN PAPER | 1 |
|---|---|---|---|---|---|
| COPY | FULL COLOR | DUPLEX | A3 | PLAIN PAPER | 1 |
| SCAN | MONOCHROME | SIMPLEX | A4 | PLAIN PAPER | 1 |

| ITEMS | COEFFICIENT |
|---|---|
| MONOCHROME | 1.0 |
| FULL COLOR | 2.0 |
| A4 | 1.0 |
| A3 | 2.0 |
| PRINT | 1.0 |
| COPY | 1.0 |
| SCAN | 0.2 |

FIG.14

| USER NAME | PASSWORD | RIGHT | CARD ID | CONSUMED POINTS | POINT UPPER LIMIT |
|---|---|---|---|---|---|
| A | Hoge | FULL COLOR, MONOCHROME | qwertyuiop | 120 | 2000 |
| B | Abc | MONOCHROME | asdfghjkl | 300 | 2500 |
| C | pass | MONOCHROME | zxcvbnm | 250 | 2200 |

36

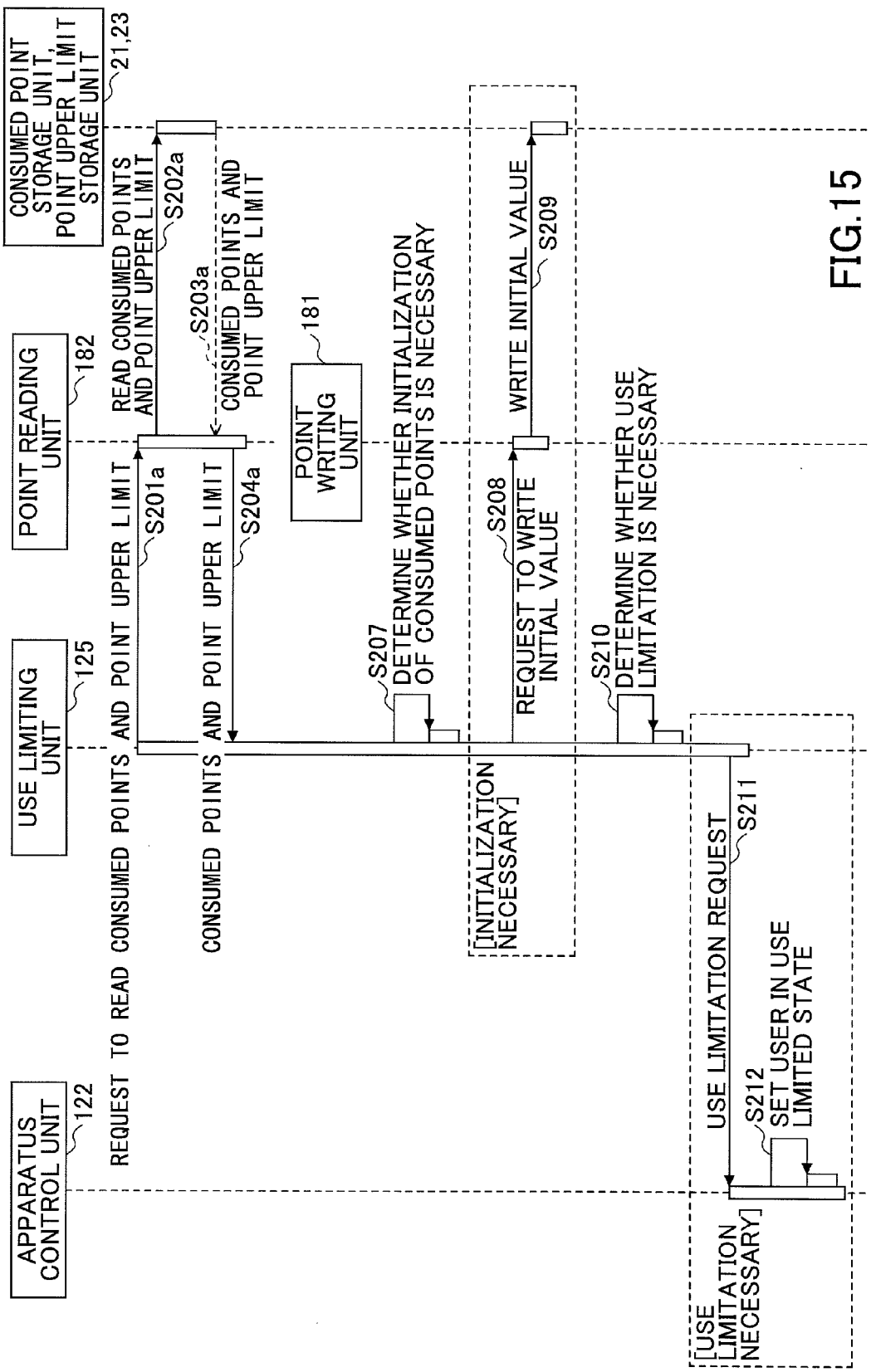

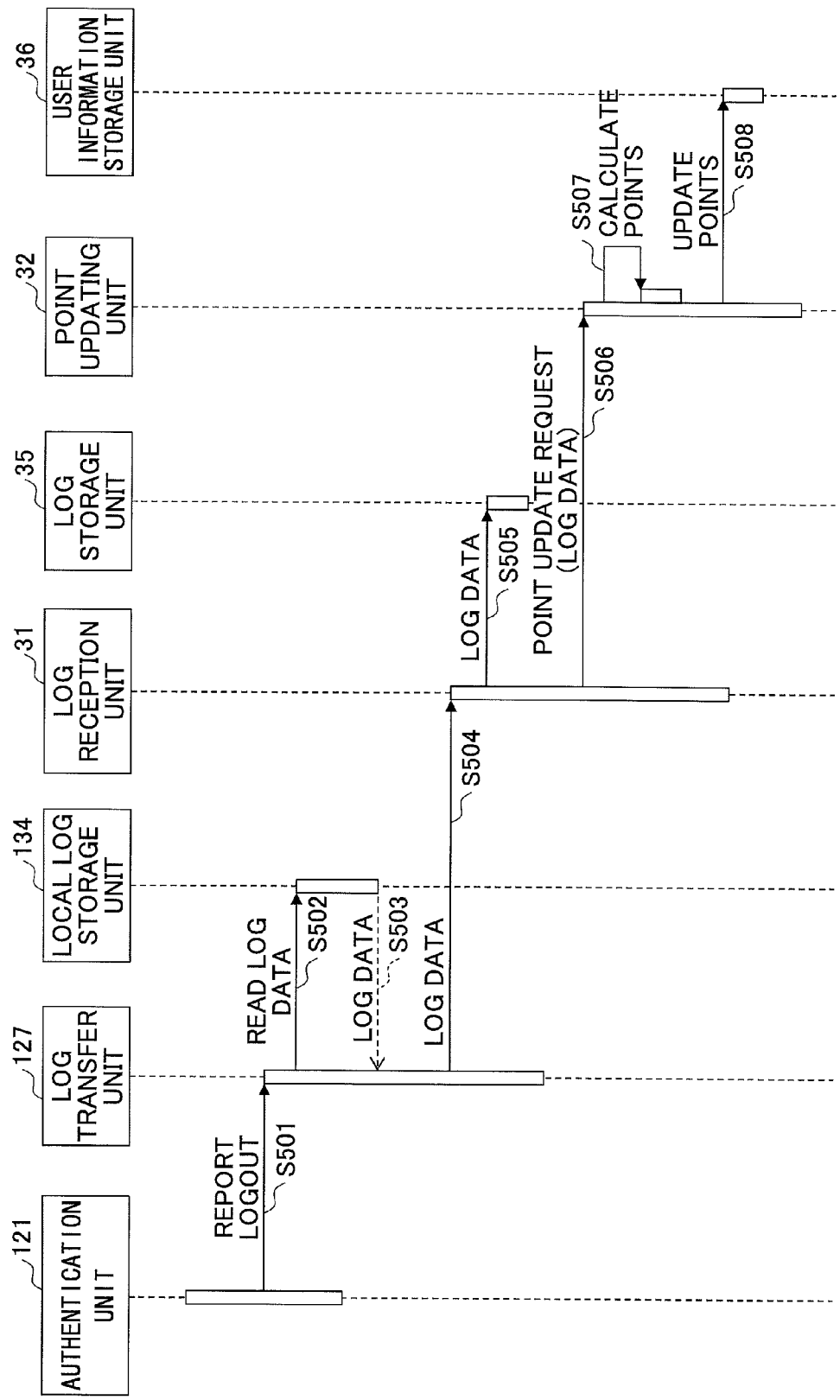

APPARATUS, USE LIMITING METHOD, AND STORAGE MEDIUM

CROSS-REFERENCE TO RELATED APPLICATIONS

The present application is based upon and claims the benefit of priority of Japanese Patent Application No. 2013-096853 filed on May 2, 2013 and Japanese Patent Application No. 2014-037010 filed on Feb. 27, 2014, the entire contents of which are incorporated herein by reference.

BACKGROUND OF THE INVENTION

1. Field of the Invention

An aspect of this disclosure relates to an apparatus, a use limiting method, and a storage medium.

2. Description of the Related Art

There exists a technology for managing upper use limits for respective users of an image forming apparatus that is shared by the users in, for example, an office. In such a technology, for example, the use of an image forming apparatus within a predetermined period by each user is limited up to points given to the user in advance. The points are consumed in proportion to the use of the image forming apparatus.

To perform total upper limit management across multiple image forming apparatuses in an office, points of users are centrally managed by a server computer that can communicate via a network with the image forming apparatuses (see, for example, Japanese Laid-Open Patent Publication No. 2011-197830).

However, it is difficult to centrally manage points by a server computer in an environment where some image forming apparatuses are not connected to a network for communicating with the server computer.

SUMMARY OF THE INVENTION

In an aspect of this disclosure, there is provided an apparatus including a reading unit that reads a first value indicating usage of the apparatus from a portable storage medium, a use limiting unit that updates the first value according to use of the apparatus and limits use of the apparatus when the updated first value reaches a predetermined value, and a writing unit that writes the updated first value into the portable storage medium.

BRIEF DESCRIPTION OF THE DRAWINGS

FIG. 4 is a table illustrating an exemplary configuration of a local user information storage unit;

FIG. 7 is a drawing illustrating an exemplary configuration of log data;

FIG. 8 is a table illustrating an exemplary configuration of a local point coefficient storage unit;

FIG. 14 is a table illustrating an exemplary configuration of a user information storage unit;

FIG. 15 is a sequence chart illustrating an exemplary use limitation determining process according to the second embodiment; and FIG. 16 is a sequence chart illustrating an exemplary process performed when a logout is detected.

DESCRIPTION OF THE PREFERRED EMBODIMENTS

Figure 1:
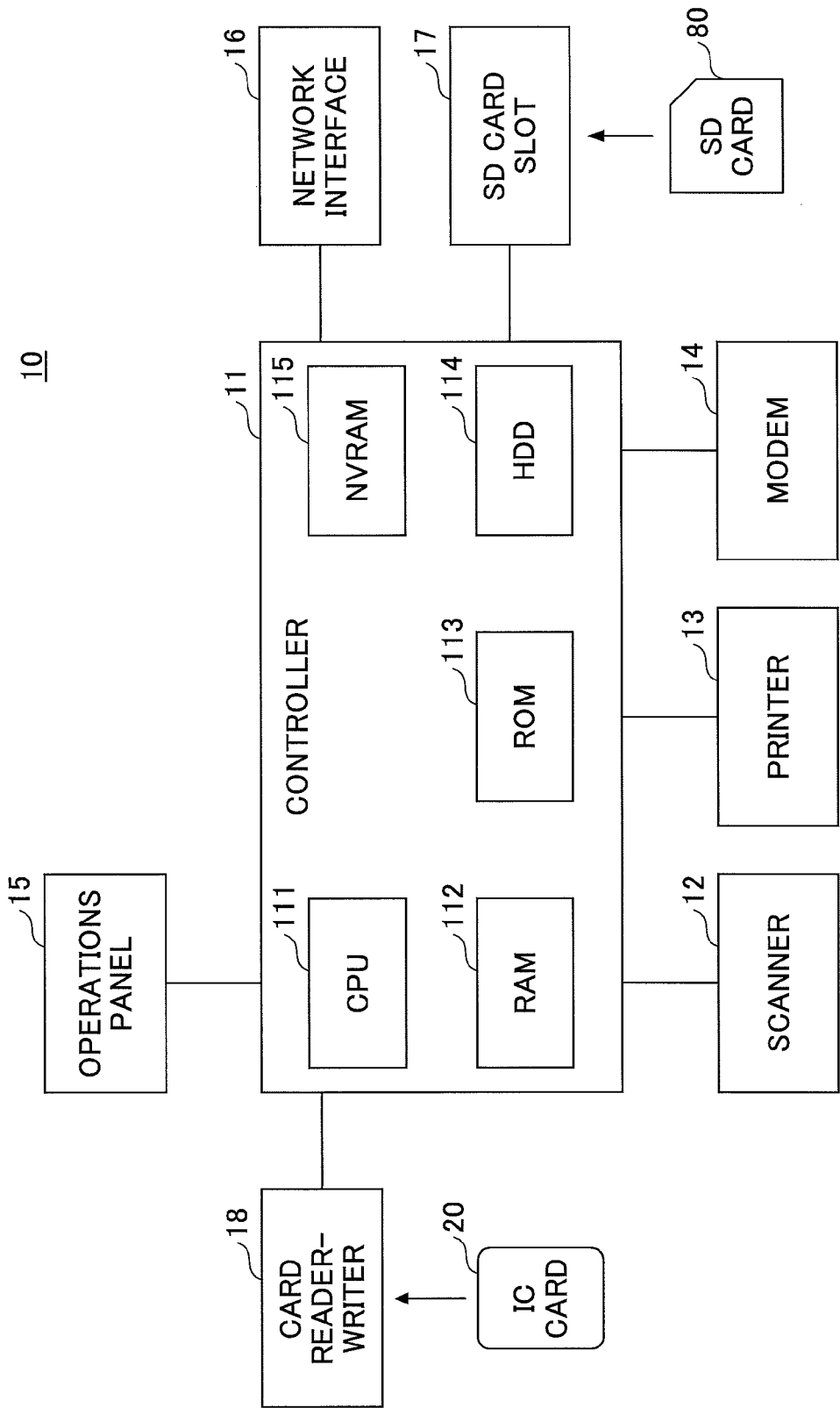
FIG. 1 is a block diagram illustrating an exemplary hardware configuration of an image forming device according to a first embodiment.

Preferred embodiments of the present invention are described below with reference to the accompanying drawings. FIG. 1 is a block diagram illustrating an exemplary hardware configuration of an image forming apparatus 10 according to a first embodiment. As illustrated by FIG. 1, the image forming apparatus 10 may include, as hardware components, a controller 11, a scanner 12, a printer 13, a modem 14, an operations panel 15, a network interface 16, a secure digital (SD) card slot 17, and a card reader-writer 18.

The controller 11 may include a central processing unit (CPU) 111, a random access memory (RAM) 112, a read-only memory (ROM) 113, a hard disk drive (HDD) 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The scanner 12 is a hardware component (image scanning unit) for scanning a document to obtain image data. The printer 13 is a hardware component (printing unit) for printing print data on a recording medium such as paper. The modem 14 is a hardware component for connecting the image forming apparatus 10 to a telephone line and is used to send and receive image data via facsimile communications. The operations panel 15 is a hardware component including an input unit such as buttons for receiving user inputs and a display unit such as a liquid crystal display panel. For example, a liquid crystal display panel including a touch panel function may be used as the display unit. In this case, the liquid crystal display panel may also function as the input unit. The network interface 16 is a hardware component for connecting the image forming apparatus 10 to a (wired or wireless) network such as a local area network (LAN). The SD card slot 17 reads, for example, programs stored in a secure digital (SD) card 80. With the image forming apparatus 10 configured as described above, in addition to the programs stored in the ROM 113 and the HDD 114, programs stored in the SD card 80 can also be loaded into the RAM 112 and executed. Instead of the SD card 80, any other storage medium (e.g., a CD-ROM or a universal serial bus (USB) memory) may be used for this purpose. That is, a storage medium that can be mounted on the image forming apparatus 10 is not limited to the SD card 80. When a storage medium other than the SD card 80 is used, the SD card slot 17 may be replaced with a hardware component corresponding to the storage medium used.

The card reader-writer 18 reads and writes information from and to an integrated circuit (IC) card 20. The card reader-writer 18 may be included in the image forming apparatus 10, or may be provided as an external device connected to the image forming apparatus 10 via an interface such as a USB interface.

Figure 2:
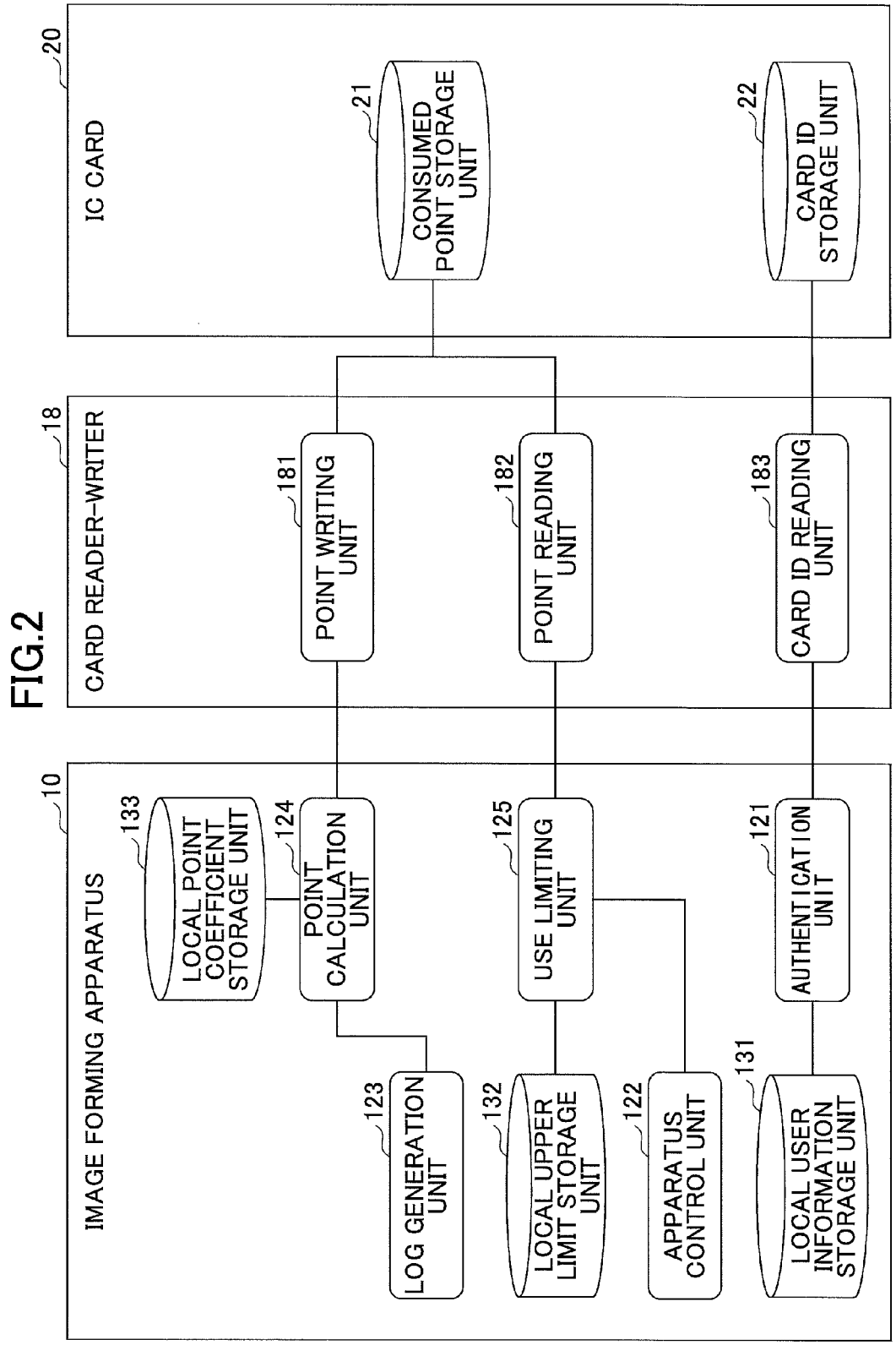
FIG. 2 is a drawing illustrating exemplary functional configurations of an image forming apparatus, a card reader-writer, and an IC card according to the first embodiment.

FIG. 2 is a drawing illustrating exemplary functional configurations of the image forming apparatus 10, the card reader-writer 18, and the IC card 20 according to the first embodiment;

As illustrated by FIG. 2, the IC card 20 includes a consumed point storage unit 21 and a card ID storage unit 22. These storage units may be implemented, for example, by a storage medium (or media) included in the IC card 20.

The consumed point storage unit 21 stores points (hereafter referred to as "consumed points") consumed by a user of the IC card 20, and the last updated date and time of the consumed points. In the present embodiment, points are an example of units indicating a degree up to which the image forming apparatus 10 can be used. A user is allowed to use the image forming apparatus 10 up to points given to the user. The points are consumed according to the use of the image forming apparatus 10 by the user. When consumed points reach the upper limit (in other words, when points held by the user become zero), the use of the image forming apparatus 10 by the user is limited (or restricted). Consumed points are reset (or initialized) at an initialization timing that occurs at regular intervals (e.g., at the beginning of each month). In other words, remaining (or retained) points of a user are restored to the upper limit at regular intervals. Also, points may be given to a user according to the amount of money paid by the user.

The card ID storage unit 22 stores a card ID. The card ID is identification information assigned to each IC card 20. In this embodiment, it is assumed that one IC card 20 is given to each user. Accordingly, the card ID can also be used as identification information of each user. Also, one IC card 20 may be shared by multiple users constituting a group such as a department.

The card reader-writer 18 may include a point writing unit 181, a point reading unit 182, and a card ID reading unit 183.

The point reading unit 182 reads consumed points and the last updated date and time of the consumed points from the consumed point storage unit 21. The point writing unit 181 writes, into the consumed point storage unit 21, consumed points that are updated according to use of the image forming apparatus 10 and the last updated date and time. The card ID reading unit 183 reads the card ID from the card ID storage unit 22.

The image forming apparatus 10 may include an authentication unit 121, an apparatus control unit 122, a log generation unit 123, a point calculation unit 124, and a use limiting unit 125. These functional units may be implemented by executing one or more programs installed in the image forming apparatus 10 by the CPU 111. The image forming apparatus 10 may also include a local user information storage unit 131, a local upper limit storage unit 132, and a local point coefficient storage unit 133. These storage units may be implemented, for example, by the HDD 114 and/or a storage device connected via a network to the image forming apparatus 10.

The authentication unit 121 performs authentication of users of the image forming apparatus 10 by referring to the local user information storage unit 131 based on card IDs read by the card ID reading unit 183. The local user information storage unit 131 stores user information including a card ID for each user. The apparatus control unit 122 controls execution of processes (jobs) corresponding to user operations. The log generation unit 123 generates log data for executed jobs. The point calculation unit 124 calculates consumed points corresponding to the executed jobs based on the log data. In the calculation of consumed points, the local point coefficient storage unit 133 is used. The local point coefficient storage unit 133 stores coefficients used to calculate consumed points. The use limiting unit 125 limits use of the image forming apparatus 10 by a user when the total consumed points of the user reaches an upper limit (which is hereafter referred to as a "point upper limit") stored in the local upper limit storage unit 132. Manners of limiting the use of the image forming apparatus 10 include, for example, preventing the use of all functions of the image forming apparatus 10, preventing the use of one or more of the functions of the image forming apparatus 10, and forcing the use of a predetermined output format. Forcing the use of a predetermined output format indicates, for example, forcing to use duplex printing or monochrome printing. Also, instead of directly limiting the use of the image forming apparatus 10, an alert message may be displayed. As still another example, an alert message may be sent to an administrator terminal. The local upper limit storage unit 132 stores a point upper limit(s). The local upper limit storage unit 132 may store different point upper limits for respective users or store the same point upper limit for all users.

Figure 3:
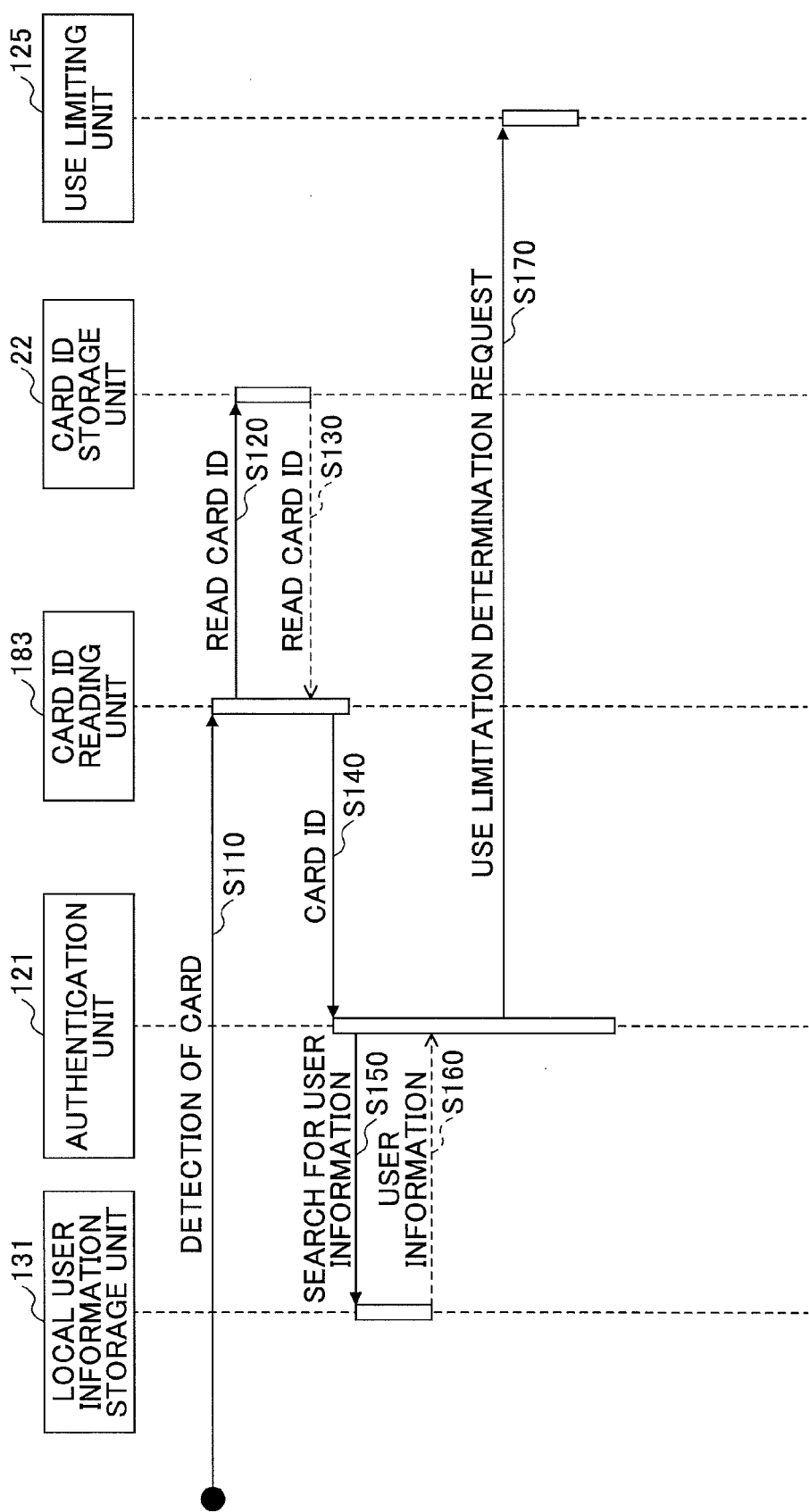
FIG. 3 is a sequence chart illustrating an exemplary process involving user authentication according to the first embodiment.

An exemplary process performed by the image forming apparatus 10 is described below. FIG. 3 is a sequence chart illustrating an exemplary process involving user authentication according to the first embodiment.

For example, when starting to use the image forming apparatus 10, a user sets the IC card 20 of the user on the card reader-writer 18. Setting the IC card 20 on the card reader-writer 18 indicates enabling the IC card 20 to communicate with the card reader-writer 18. For example, the IC card 20 may be inserted into the card reader-writer 18 or held over the card reader-writer 18. The IC card 20 may be a contactless IC card.

When detecting that the IC card 20 is set on the card reader-writer 18 (S110), the card ID reading unit 183 reads a card ID from the card ID storage unit 22 of the IC card 20 (S120, S130). The card ID reading unit 183 inputs the read card ID to the authentication unit 121 (S140). Inputting the card ID to the authentication unit 121 is an example of making an authentication request. In the descriptions of the process below, the IC card 20 indicates the IC card 20 set on the card reader-writer 18.

The authentication unit 121 searches the local user information storage unit 131 for user information corresponding to the card ID (S150, S160).

FIG. 4 is a table illustrating an exemplary configuration of the local user information storage unit 131. As illustrated by FIG. 4, the local user information storage unit 131 stores user information for each user. The user information includes, for example, a user name, a password, a right, and a card ID. The user name is an identifier of the user. The password is used by the user to access the image forming apparatus 10. The right is information indicating, for example, a function(s) that the user is allowed to use and/or a parameter(s) that the user is allowed to set. The card ID is identification information of the IC card 20 given to the user.

In the present embodiment, the authentication unit 121 determines that the authentication of the user is successful when user information including the card ID read at step S130 is found. When the authentication is successful, the user is treated as a logged-in user who has logged into the image forming apparatus 10. The user information of the user is stored, for example, in the RAM 112 while the user is logged in.

As another example, the IC card 20 may store a user name. In this case, the card reader-writer 18 reads the user name instead of the card ID from the IC card 20, and the authentication unit 121 performs authentication using the read user name. As still another example, the authentication unit 121 may be configured to search the local user information storage unit 131 to find user information including the read card ID, send a user name and a password in the found user information to an external authentication apparatus, and determine whether the authentication is successful based on an authorization result received from the external authentication apparatus. Thus, the IC card 20 may store any type of authentication information that is used directly for user authentication (i.e., information read from the IC card 20 is used to determine whether the user is authorized) or used indirectly for user authentication (i.e., information obtained based on information read from the IC card 20 is used to determine whether the user is authorized).

When the corresponding user information is not found, the authentication unit 121 determines that the authentication of the user has failed, and the remaining part of the process is not performed.

When the authentication is successful, the authentication unit 121 requests the use limiting unit 125 to perform a use limitation determining process for the logged-in user (S170).

Figure 5:
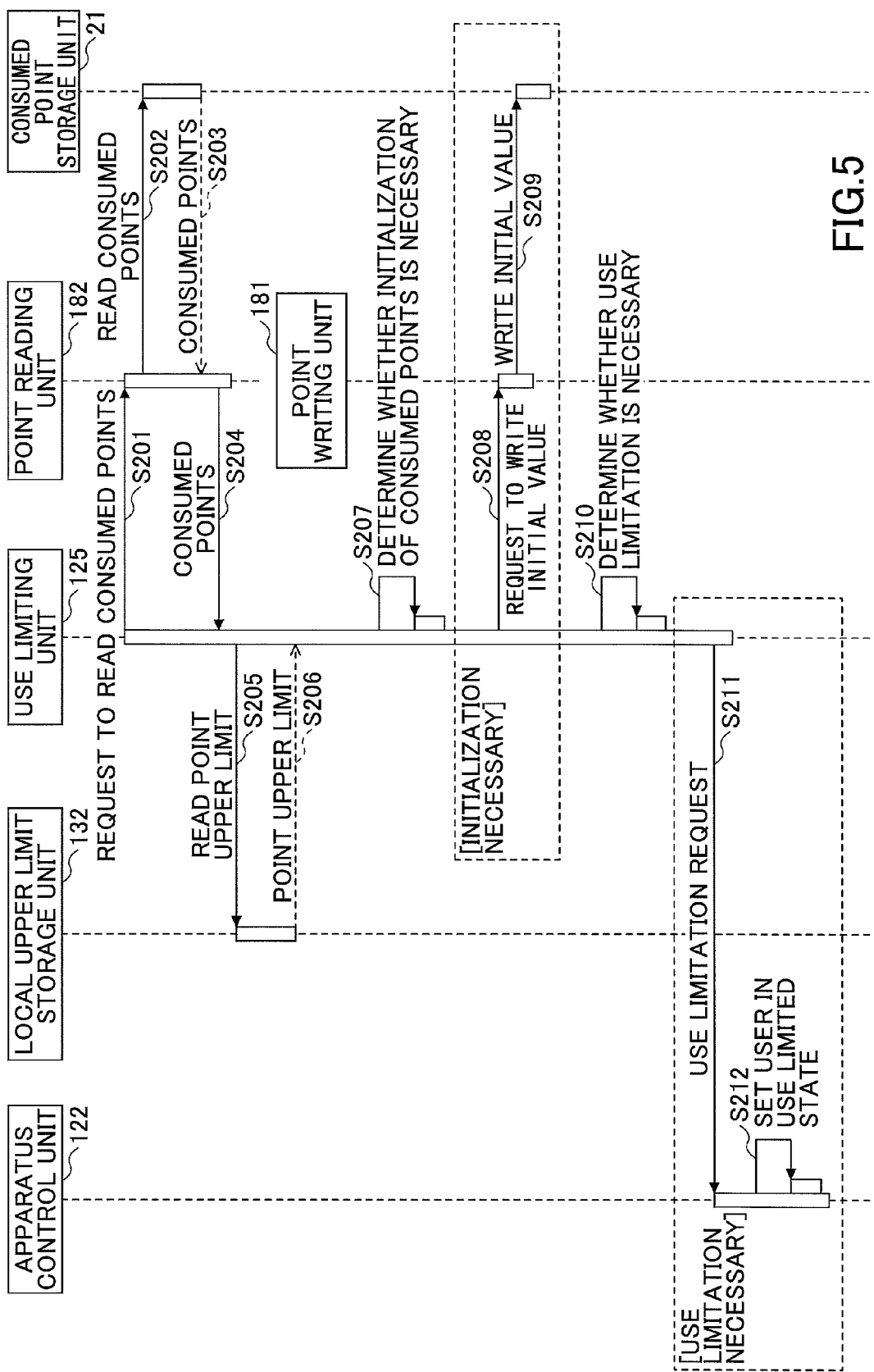
FIG. 5 is a sequence chart illustrating an exemplary use limitation determining process according to the first embodiment.

Next, an exemplary process performed in response to step S170 of FIG. 3 is described. FIG. 5 is a sequence chart illustrating an exemplary use limitation determining process according to the first embodiment.

In response to the request to perform a use limitation determining process, the use limiting unit 125 requests the point reading unit 182 of the card reader-writer 18 to obtain consumed points (S201).

The point reading unit 182 reads consumed points and the last updated date and time of the consumed points from the consumed point storage unit 21 of the IC card 20 (S202, S203). The point reading unit 182 sends the consumed points and the last updated date and time read from the consumed point storage unit 21 to the use limiting unit 125 (S204). The consumed points are represented by, for example, a value.

Next, the use limiting unit 125 reads, from the local upper limit storage unit 132, the point upper limit and information indicating the initialization timing when consumed points are initialized (S205, S206). The information indicating the initialization timing is, for example, a value that indicates the beginning of each month. Next, the use limiting unit 125 determines whether it is necessary to initialize consumed points (S207). More specifically, when the initialization timing is between the last updated date and time and the current date and time, the use limiting unit 125 determines that initialization of the consumed points is necessary. That is, when the logged-in user uses the image forming apparatus 10 for the first time after the initialization timing, the use limiting unit 125 determines that initialization of the consumed points is necessary.

When initialization of the consumed points is necessary, the use limiting unit 125 requests the point writing unit 181 to write a consumed point initial value and new last updated date and time indicating the current date and time (S208). The point writing unit 181 overwrites the consumed points and the last updated date and time in the consumed point storage unit 21 with the consumed point initial value and the new last updated date and time (S209). The consumed point initial value is, for example, 0 that indicates no point has been consumed.

Next, the use limiting unit 125 determines whether use limitation is necessary (i.e., whether it is necessary to limit the use of the image forming apparatus 10 by the user) by comparing the consumed points with the point upper limit (S210). More specifically, when the consumed points have reached the point upper limit (in other words, when remaining points of the user are zero), the use limiting unit 125 determines that use limitation is necessary. On the other hand, when the consumed points are less than the point upper limit (in other words, when remaining points of the user are greater than or equal to 1), the use limiting unit 125 determines that use limitation is not necessary. In the case where the consumed points are initialized (i.e., when steps S208 and S209) have been performed, the consumed point initial value is compared with the point upper limit.

Also, the use limiting unit 125 may be configured to determine that use limitation is necessary even when the remaining points are greater than or equal to 1. For example, the use limiting unit 125 may be configured to gradually apply different levels of use limitation depending on the number of remaining points.

When it is necessary to limit the use of the image forming apparatus 10, the use limiting unit 125 sends a use limitation request to the apparatus control unit 122 (S211). In response, the apparatus control unit 122 sets the logged-in user in a use limited state (S212). As a result, the use of the image forming apparatus 10 by the logged-in user is limited. When the use of the image forming apparatus 10 by the logged-in user is limited, for example, a screen where some of the functions of the image forming apparatus 10 are disabled for the logged-in user may be displayed, or a job requested by the logged-in user may be cancelled when the job requires a function that the logged-in user is not allowed to use.

Figure 6:
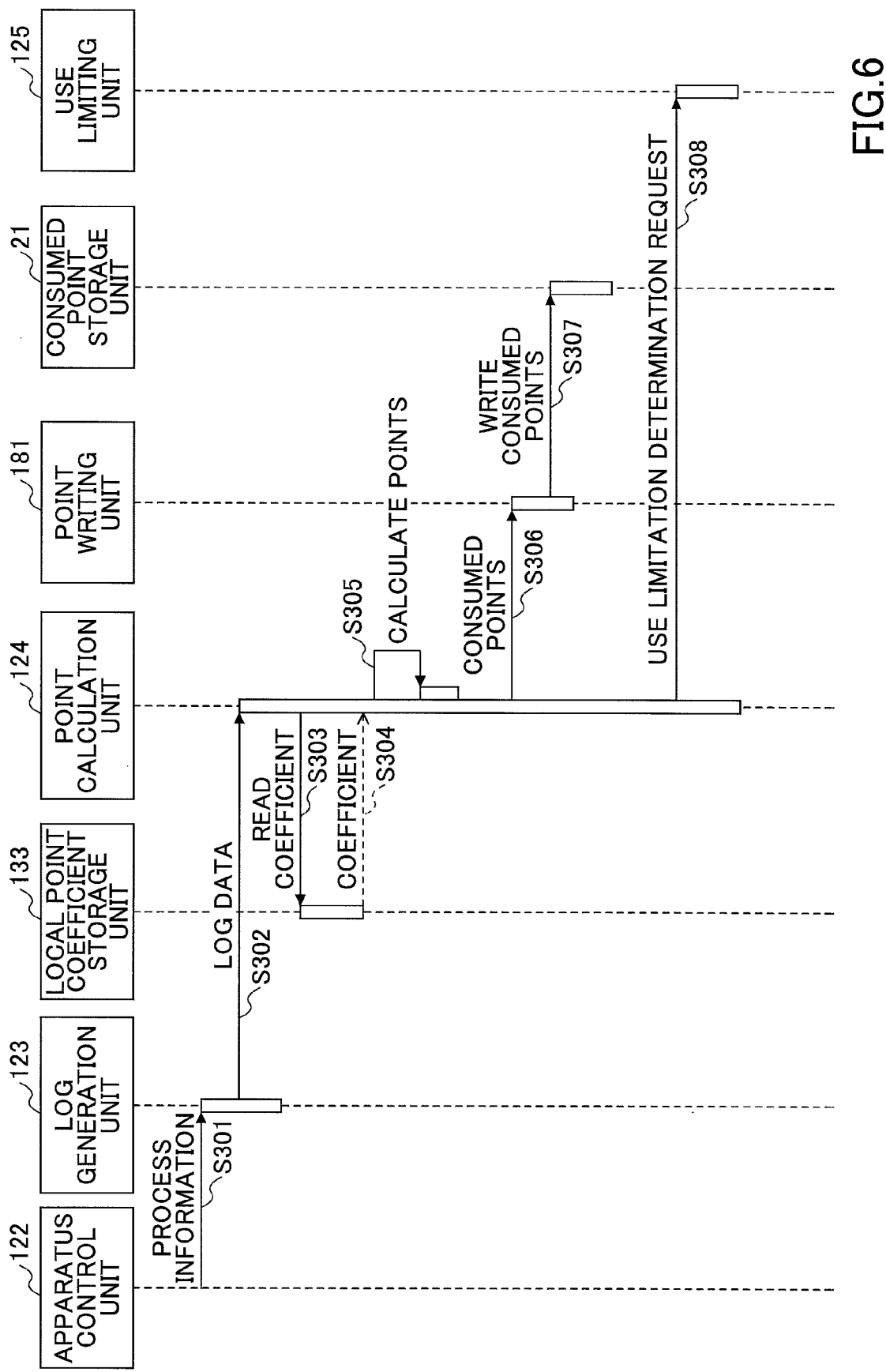
FIG. 6 is a sequence chart illustrating an exemplary process performed when a job is executed.

Next, an exemplary process performed when a job is executed is described. FIG. 6 is a sequence chart illustrating an exemplary process performed when a job is executed.

During a job that is executed in response to a user operation, each time a process (which is hereafter referred to as a "one-side process") for one side of a document or a paper sheet (hereafter, a "page" also indicates one side of a document or a paper sheet) is completed, the apparatus control unit 122 sends process information indicating the one-side process to the log generation unit 123 (S301). The process information indicates, for example, a copying, scanning, or printing process for one page. In the present embodiment, to determine the necessity of use limitation for each page, the apparatus control unit 122 is configured to send process information to the log generation unit 123 each time a one-side process is completed. Alternatively, when it is sufficient to determine the necessity of use limitation for each job, the apparatus control unit 122 may be configured to send job information to the log generation unit 123 each time a job is completed.

Next, the log generation unit 123 generates log data based on the process information sent from the apparatus control unit 122, and sends the generated log data to the point calculation unit 124 (S302).

FIG. 7 is a drawing illustrating an exemplary configuration of log data. FIG. 7 illustrates three examples of log data. Each set of log data includes the type of a job (e.g., copy or scan) and parameters for the job. The last item in the log data indicates the number of pages (or sides) processed. In the present embodiment, because log data is generated for each page, the number of pages in the log data is "1".

Next, the point calculation unit 124 obtains coefficients used to calculate consumed points from the local point coefficient storage unit 133 (S303, S304).

FIG. 8 is a table illustrating an exemplary configuration of the local point coefficient storage unit 133. As illustrated by FIG. 8, the local point coefficient storage unit 133 stores coefficients for job types and job parameters.

Next, the point calculation unit 124 calculates consumed points for the "current" one-side process (S305). Consumed points are calculated, for example, according to a formula below.

Consumed points=number of pages×coefficient of job type×coefficients of parameters For example, consumed points for the first log data (uppermost log data) in FIG. 7 are calculated as follows:

Consumed points=1.0(one page)×1.0(copy)×1.0 (monochrome)×1.0(A4)

The point calculation unit 124 adds the calculated consumed points (for the current one-side process) to consumed points stored in the RAM 112 to obtain updated consumed points, and requests the point writing unit 181 to write the updated consumed points into the consumed point storage unit 21 (S306). The point writing unit 181 overwrites the consumed points and the last updated date and time in the consumed point storage unit 21 with the updated consumed points and new last updated date and time (S307).

Thus, according to the present embodiment, consumed points in the IC card 20 are updated each time a one-side process is performed. This configuration makes it possible to prevent, for example, a dishonest act where the IC card 20 is removed from the card reader-writer 18 while a job is being executed to obtain an output of the job without updating consumed points in the IC card 20.

The point calculation unit 124 requests the use limiting unit 125 to perform a use limitation determining process for the logged-in user based on the updated consumed points (S308). In response to the request, the use limiting unit 125 performs a use limitation determining process as described above with reference to FIG. 5. The above process makes it possible to determine the necessity of use limitation for each page.

Figure 9:
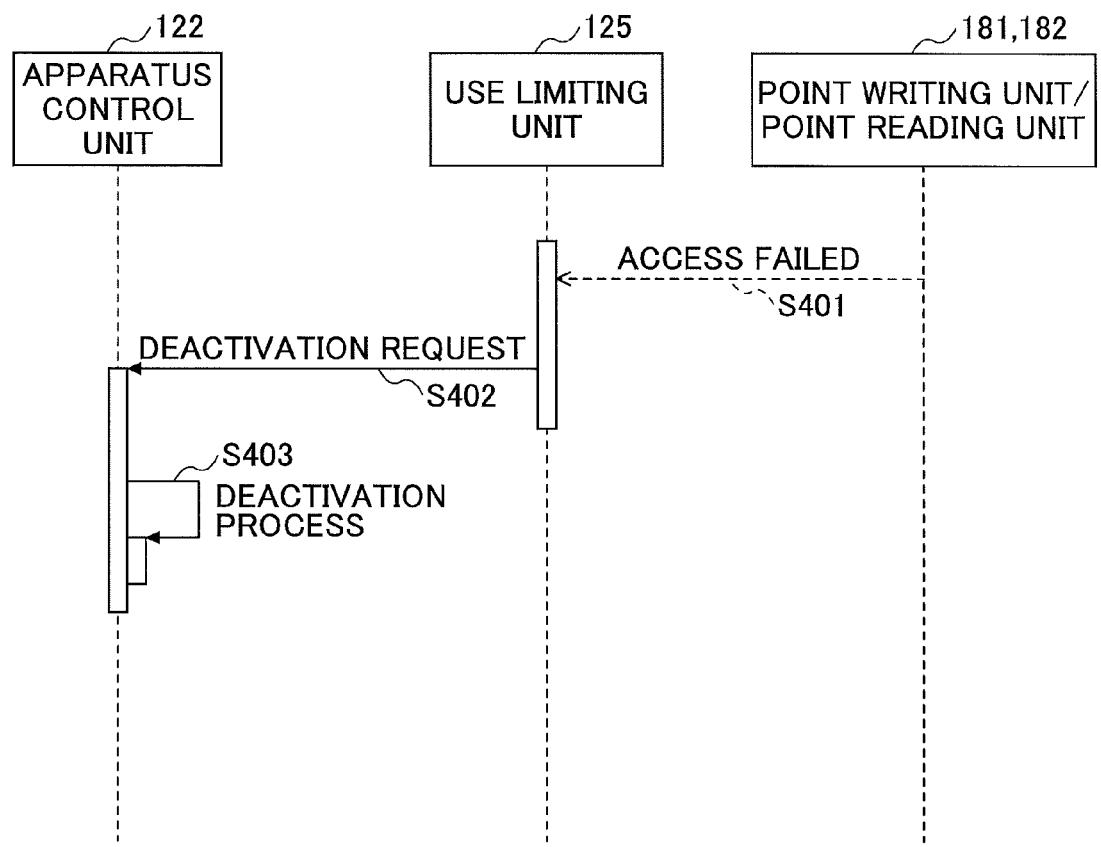
FIG. 9 is a sequence chart illustrating an exemplary process performed when communication with an IC card is disabled.

Next, an exemplary process performed when communication with the IC card 20 fails is described. FIG. 9 is a sequence chart illustrating an exemplary process performed when communication with the IC card 20 fails.

For example, the process of FIG. 9 is performed when the point reading unit 182 fails to read consumed points at step S202 of FIG. 5, or the point writing unit 181 fails to write the initial value or consumed points at step S209 of FIG. 5 or step S307 of FIG. 6. When failed in reading or writing consumed points, the point reading unit 182 or the point writing unit 181 reports the failure ("access failed") to the use limiting unit 125 (S401). When receiving the report, the use limiting unit 125 sends a deactivation request to the apparatus control unit 122 (S402). In response to the deactivation request, the apparatus control unit 122 deactivates all functions of the image forming apparatus 10 or functions of the image forming apparatus 10 that require consumption of points (S403).

The process of FIG. 9 may be performed when the card reader-writer 18 detects that the IC card 20 is removed.

The process of FIG. 9 makes it possible to more effectively prevent a dishonest act of obtaining an output of a job without consuming points.

As described above, according to the present embodiment, consumed points are stored in the IC card 20. This configuration makes it possible to use the same IC card 20 for multiple image forming apparatuses 10, and thereby makes it possible to perform total upper limit management across the multiple image forming apparatuses 10 without using a network.

The present embodiment may also be applied to an environment where multiple image forming apparatuses 10 are connected to each other via a network. Further, the present embodiment may be applied to an environment including a server computer for centrally managing consumed points. In this case, consumed points can be managed by both of the server computer and the IC card 20. For example, consumed points may be managed by the IC card 20 while a network failure occurs, and the consumed points being managed by the IC card 20 may be sent to the server computer after the network recovers from the failure.

The point upper limit and the coefficients used to calculate points may be stored in the IC card 20. Instead of consumed points, remaining points may be stored in the IC card 20. In other words, remaining points are also an example of a value indicating consumption of points.

A portable storage medium other than the IC card 20 may also be used. Examples of storage media include a universal serial bus (USB) memory, a secure digital (SD) card, and a portable information processing terminal (e.g., a cell phone, a smartphone, or a tablet terminal).

Next, a second embodiment is described. Below, differences between the first and second embodiments are mainly described. Accordingly, configurations and methods of the second embodiment that are not described below may be substantially the same as those of the first embodiment.

Figure 10:
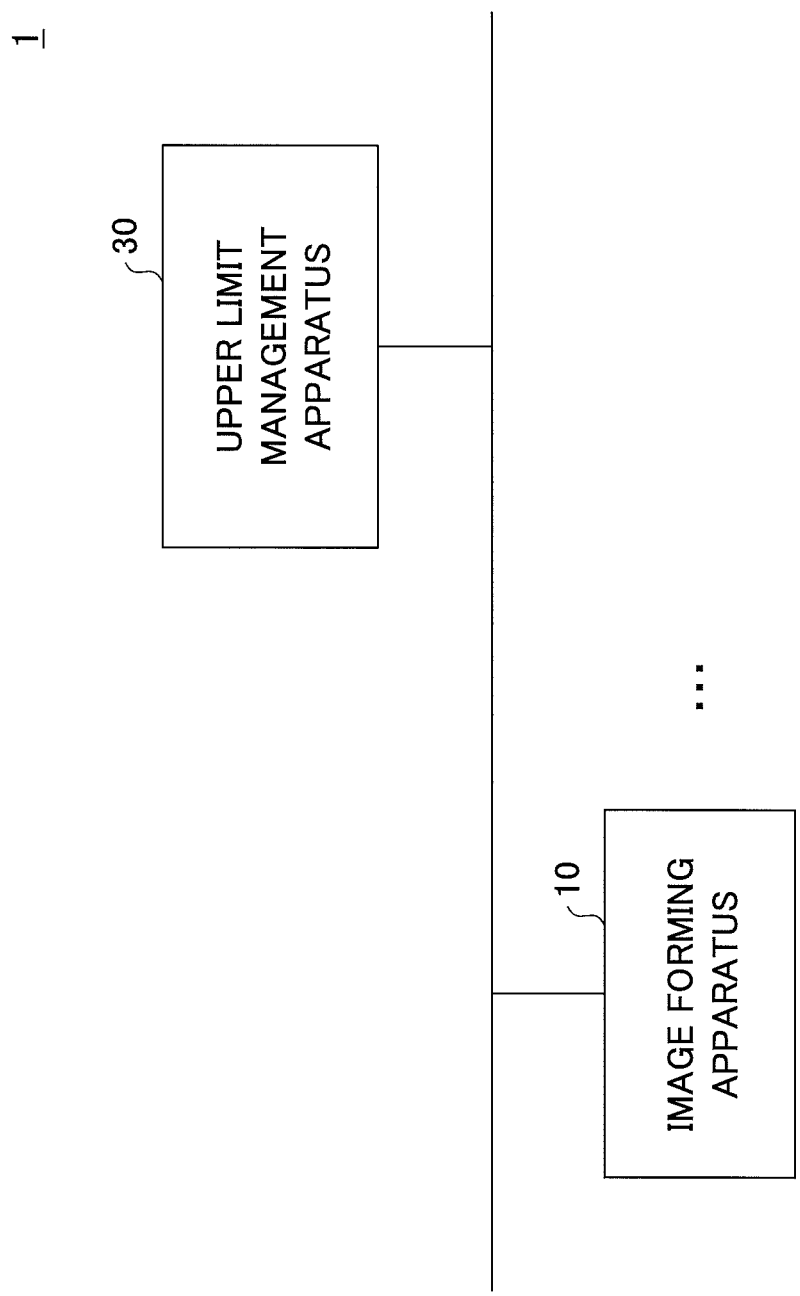
FIG. 10 is a drawing illustrating an exemplary configuration of an upper limit management system according to a second embodiment.

FIG. 10 is a drawing illustrating an exemplary configuration of an upper limit management system 1 according to the second embodiment. In the upper limit management system 1 of FIG. 10, one or more image forming apparatuses 10 and an upper limit management apparatus 30 are connected to each other via a network such as a local area network (LAN) or the Internet.

The upper limit management apparatus 30 centrally manages various types of information related to upper limit management of the image forming apparatuses 10. In the second embodiment, for example, consumed points of users and point upper limits are centrally managed by the upper limit management apparatus 30 to perform total upper limit management across multiple image forming apparatuses 10. However, to effectively perform upper limit management even when a communication failure occurs between the upper limit management apparatus 30 and the image forming apparatuses 10, the IC card 20 is also used as in the first embodiment.

Figure 11:
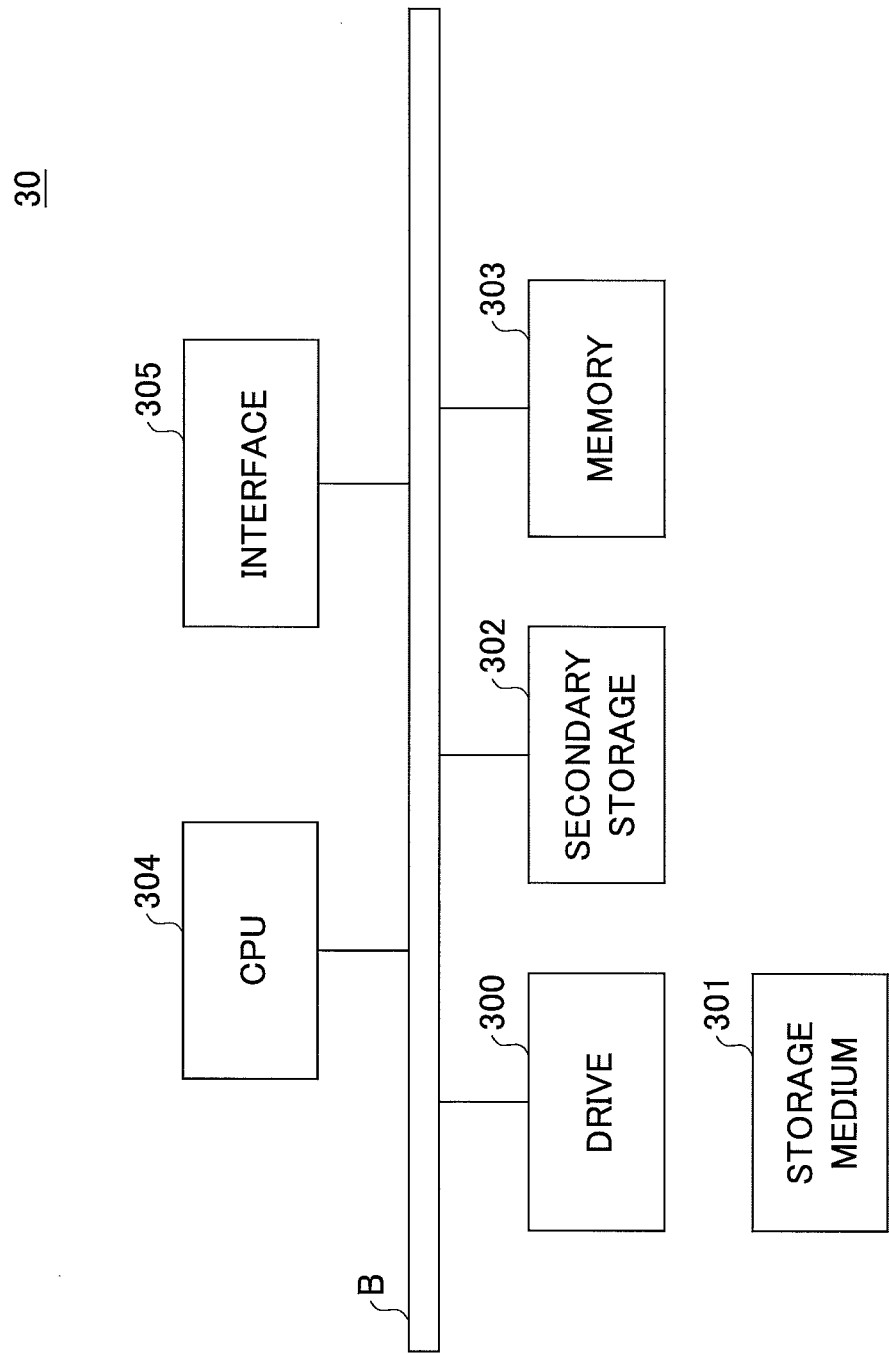
FIG. 11 is a block diagram illustrating an exemplary hardware configuration of an upper limit management apparatus according to the second embodiment.

FIG. 11 is a block diagram illustrating an exemplary hardware configuration of the upper limit management apparatus 30 according to the second embodiment. As illustrated by FIG. 11, the upper limit management apparatus 30 may include a drive 300, a secondary storage 302, a memory 303, a CPU 304, and an interface 305 that are connected to each other via a bus B.

Programs for executing various processes at the upper limit management apparatus 30 may be provided via a storage medium 301 such as a CD-ROM, a DVD-ROM, or a USB memory. When the storage medium 301 storing programs is mounted on the drive 300, the programs are read by the drive 300 from the storage medium 301 and are installed in the secondary storage 302. Programs may not necessarily be installed from the storage medium 301. For example, programs may be downloaded via a network from another computer. The secondary storage unit 302 stores the installed programs and other necessary files and data.

The memory 303 temporarily stores programs read from the secondary storage 302 when the programs are executed. The CPU 304 implements functions of the upper limit management apparatus 30 according to the programs temporarily stored in the memory 303. The interface 305 connects the upper limit management apparatus 30 to a network.

Figure 12:
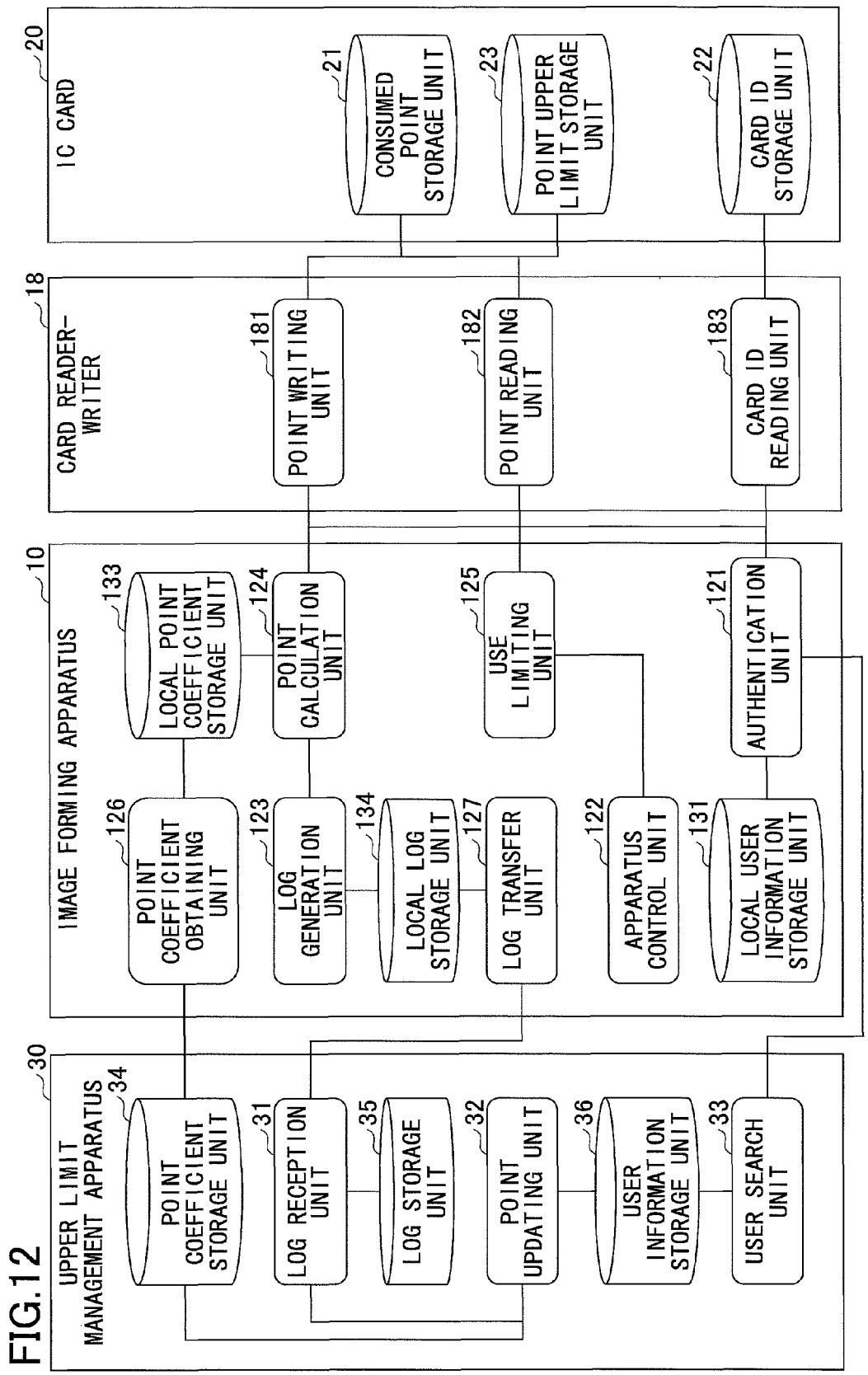
FIG. 12 is a drawing illustrating an exemplary functional configuration of an upper limit management system according to the second embodiment.

FIG. 12 is a drawing illustrating an exemplary functional configuration of the upper limit management system 1 according to the second embodiment. The same reference numbers as in FIG. 11 are assigned to the corresponding components in FIG. 12, and descriptions of those components are omitted here.

As illustrated by FIG. 12, the upper limit management apparatus 30 may include a log reception unit 31, a point updating unit 32, and a user search unit 33. These functional units may be implemented by executing one or more programs installed in the upper limit management apparatus 30 by the CPU 304. The upper limit management apparatus 30 may also include a point coefficient storage unit 34, a log storage unit 35, and a user information storage unit 36. These storage units may be implemented, for example, by the secondary storage 302 and/or a storage device connected via a network to the upper limit management apparatus 30.

The log reception unit 31 receives, from the image forming apparatus 10, log data that is generated by the log generation unit 123 during a period after a user logs into the image forming apparatus 10 and until the user logs out of the image forming apparatus 10. The log reception unit 31 stores the received log data in the log storage unit 35.

The point updating unit 32 calculates consumed points for the log data received by the log reception unit 31 based on coefficients stored in the point coefficient storage unit 34. The point updating unit 32 updates consumed points, which are stored in the user information storage unit 36 in association with a user corresponding to the log data, based on the calculated consumed points.

The user search unit 33 searches the user information storage unit 36 for user information of a user attempting to log into the image forming apparatus 10, in response to a request from the authentication unit 121 of the image forming apparatus 10. The user search unit 33 sends found user information to the authentication unit 121.

The user information storage unit 36 stores information items that are stored in the local user information storage unit 131 for each user, and also stores consumed points and a point upper limit for each user.

The point coefficient storage unit 34 stores coefficients used to calculate consumed points. For example, the point coefficient storage unit 34 has a configuration similar to the local point coefficient storage unit 133 illustrated by FIG. 8.

The image forming apparatus 10 may also include a point coefficient obtaining unit 126 and a log transfer unit 127. These functional units may be implemented by executing one or more programs installed in the image forming apparatus 10 by the CPU 111. The image forming apparatus 10 may also include a local log storage unit 134. The local log storage unit 134 may be implemented, for example, by the HDD 114 and/or a storage device connected via a network to the image forming apparatus 10.

The point coefficient obtaining unit 126 performs a process to synchronize contents of the local point coefficient storage unit 133 with the contents of the point coefficient storage unit 34. Here, point coefficients may be changed according to changes in prices of, for example, toner and paper. The changes to the point coefficients are applied to the point coefficient storage unit 34 of the upper limit management apparatus 30. As a result, the contents of the local point coefficient storage unit 133 become different from the contents of the point coefficient storage unit 34. The point coefficient obtaining unit 126 performs a synchronization process to resolve the difference. For example, the point coefficient obtaining unit 126 periodically downloads information stored in the point coefficient storage unit 34, and stores the downloaded information in the local point coefficient storage unit 133. Point coefficients may be managed by versions. In this case, the point coefficient obtaining unit 126 may be configured to download information stored in the point coefficient storage unit 34 when the version of point coefficients stored in the point coefficient storage unit 34 is newer than the version of point coefficients store in the local point coefficient storage unit 133.

The local log storage unit 134 stores log data generated by the log generation unit 123. The local log storage unit 134 may also be used in the image forming apparatus 10 of the first embodiment. The log transfer unit 127 transfers, to the upper limit management apparatus 30, log data that is generated and stored in the local log storage unit 134 during a period after a user logs into the image forming apparatus 10 and until the user logs out of the image forming apparatus 10.

The IC card 20 also includes a point upper limit storage unit 23. The point upper limit storage unit 23 stores a point upper limit that is included in user information obtained (or downloaded) from the upper limit management apparatus 30 when the user logs into the image forming apparatus 10. The point upper limit is also stored in the IC card 20 to make it possible to obtain the point upper limit of the user even when communication failure occurs between the image forming apparatus 10 and the upper limit management apparatus 30.

Also, similarly to in the first embodiment, the point upper limit of each user may be stored in the local point upper limit storage unit 132. The second embodiment employs a design concept where information of each user is stored in the IC card 20, and therefore the point upper limit is stored in the IC card 20. For this reason, as illustrated by FIG. 12, the image forming apparatus 10 of the second embodiment does not include the local point upper limit storage unit 132.

Figure 13:
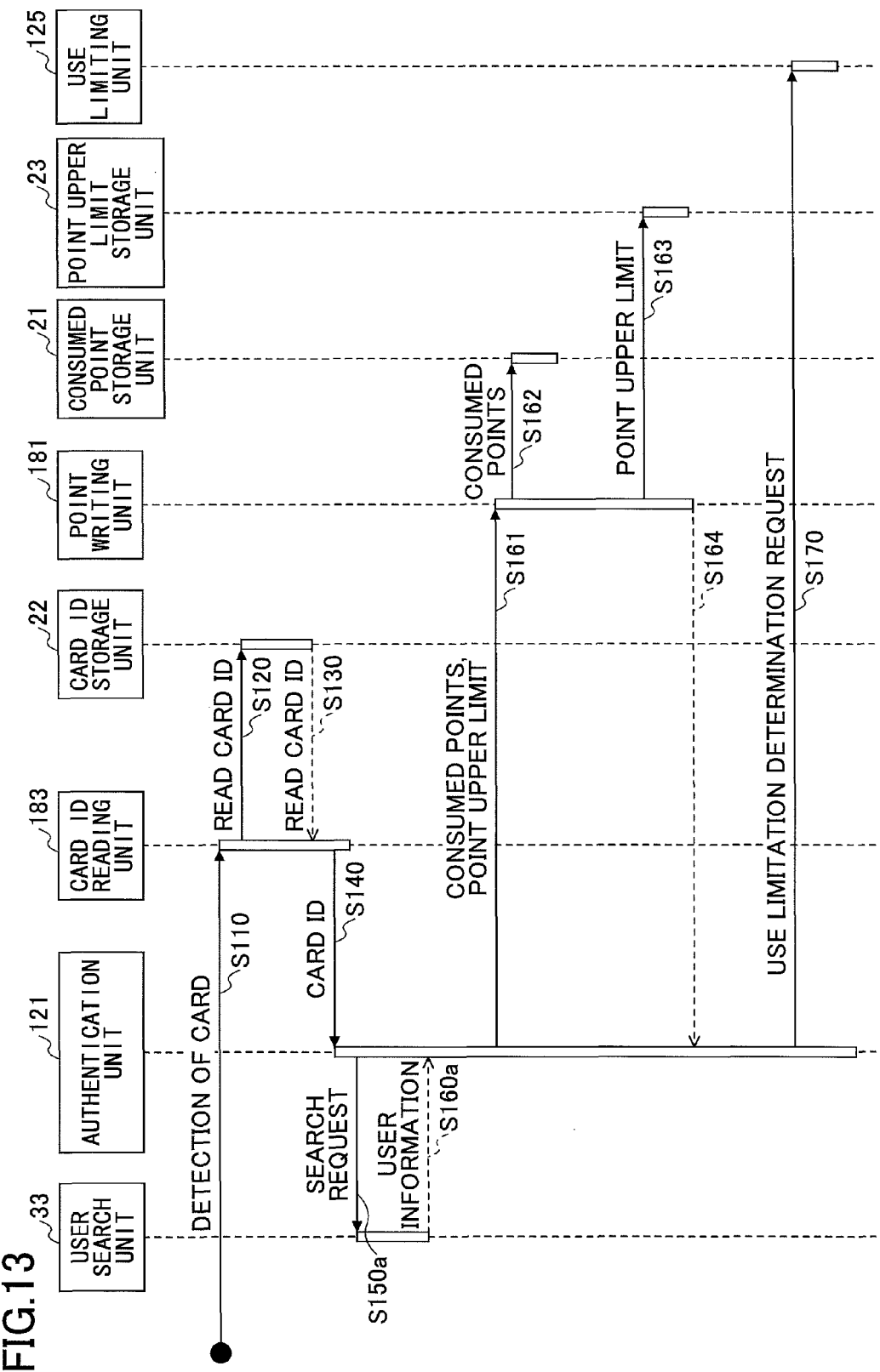
FIG. 13 is a sequence chart illustrating an exemplary process involving user authentication according to the second embodiment.

An exemplary process performed by the upper limit management system 1 is described below. FIG. 13 is a sequence chart illustrating an exemplary process involving user authentication according to the second embodiment. The same reference numbers as in FIG. 3 are assigned to the corresponding steps in FIG. 13, and descriptions of those steps are omitted. In FIG. 13, steps S150 and S160 of FIG. 3 are replaced with steps S150a and S160a, and steps S161 through S164 are added.

At step S150a, when the image forming apparatus 10 can communicate with the upper limit management apparatus 30, the authentication unit 121 sends a search request to request the user search unit 33 of the upper limit management apparatus 30 to search for user information corresponding to a card ID. The user search unit 33 searches the user information storage unit 36 to find user information corresponding to the card ID in the search request.

FIG. 14 is a table illustrating an exemplary configuration of the user information storage unit 36. As illustrated by FIG. 14, the user information storage unit 36 stores information items that are stored in the local user information storage unit 131 illustrated by FIG. 4, and also stores consumed points and a point upper limit for each user. The consumed points of each user stored in the user information storage unit 36 are initialized at regular intervals by the point updating unit 32.

The user search unit 33 sends the found user information to the authentication unit 121 (S160a). When the corresponding user information is not found, the user search unit 33 sends the authentication unit 121 information indicating that the corresponding user information is not present in the user information storage unit 36.

When the user information is received, the authentication unit 121 determines that the authentication is successful. When no user information is received, the authentication unit 121 determines that the authentication has failed. When the authentication fails, subsequent steps are not performed.

When the authentication is successful, the authentication unit 121 requests the point writing unit 181 to write consumed points and a point upper limit included in the received user information into the IC card 20 (S161). The authentication unit 121 may be configured to store information items in the received user information other than the consumed points and the point upper limit in the local user information storage unit 131. When user information including the card ID that is the same as the card ID in the received user information is already stored in the local user information storage unit 131, the user information in the local user information storage unit 131 may be overwritten with the received user information. This makes it possible to keep user information of logged-in users in the local user information storage unit 131 up to date.

The point writing unit 181 stores the consumed points in the consumed point storage unit 21 of the IC card 20 (S162). Also, the point writing unit 181 updates the last updated date and time stored in the consumed point storage unit 21 with, for example, the current date and time. Further, the point writing unit 181 stores the point upper limit in the point upper limit storage unit 23 of the IC card 20 (S163). Through the above steps, values stored in the consumed point storage unit 21 and the point upper limit storage unit 23 are overwritten (or updated). After the writing process by the point writing unit 181 is completed (S164), step S170 (use limitation determination request) is performed.

According to the process of FIG. 13, each time a user logs into the image forming apparatus 10, the consumed points and the point upper limit in the IC card 20 of the user are overwritten with the consumed points and the point upper limit stored in the upper limit management apparatus 30. This is because there is possibility that the consumed points and the point upper limit in the IC card 20 are different from the consumed points and the point upper limit stored in the upper limit management apparatus 30. Here, the point upper limit of each user may be changed. The change in the point upper limit is applied to the user information storage unit 36. Also, in the second embodiment, as described later, the upper management apparatus 30 calculates consumed points separately from the image forming apparatus 10. When, for example, coefficients in the point coefficient storage unit 34 are updated while a user is logged in the image forming apparatus 10, consumed points calculated by the image forming apparatus 10 and consumed points calculated by the upper limit management apparatus 30 based on the same log data may become different from each other. For the above reasons, in the second embodiment, the consumed points and the point upper limit in the IC card 20 of a user are overwritten with the consumed points and the point upper limit stored in the upper limit management apparatus 30 each time the user logs into the image forming apparatus 10. In an environment where the above problem hardly occurs, steps S161 through S164 may be omitted as long as consumed points and a point upper limit are stored in the IC card 20.

Next, an exemplary process performed in response to step S170 of FIG. 13 is described. FIG. 15 is a sequence chart illustrating an exemplary use limitation determining process according to the second embodiment. The same reference numbers as in FIG. 5 are assigned to the corresponding steps in FIG. 15, and descriptions of those steps are omitted. In FIG. 15, steps S201 through S204 of FIG. 5 are replaced with steps S201a through S204a, and steps S205 and S206 are removed.

In response to the request to perform a use limitation determining process, the use limiting unit 125 requests the point reading unit 182 of the card reader-writer 18 to obtain consumed points and a point upper limit (S201a). The point reading unit 182 reads the consumed points and the last updated date and time from the consumed point storage unit 21 of the IC card 20, and also reads the point upper limit from the point upper limit storage unit 23 (S202a, S203a). The point reading unit 182 sends the consumed points, the last updated date and time, and the point upper limit read from the IC card 20 to the use limiting unit 125 (S204a). Thus, in the second embodiment, the point upper limit is also read from the IC card 20, and therefore steps S205 and S206 are not necessary.

Steps S207 through S212 are substantially the same as those described with reference to FIG. 5. However, when user information of the user is received from the upper limit management apparatus 30 at step S160a of FIG. 13 during the login process, steps S207 through S209 may be omitted. This is because consumed points in the upper limit management apparatus 30 are initialized at regular intervals. Still, however, when the user continues to be in the logged-in state across the initialization timing, steps S207 through S209 may be performed.

A process that is substantially the same as the process described in the first embodiment with reference to FIG. 6 is also performed in the second embodiment, except that the log generation unit 123 stores the log data generated in response to step S301 in the local log storage unit 134.

Next, an exemplary process performed when a user logs out of the image forming apparatus 10 is described. FIG. 16 is a sequence chart illustrating an exemplary process performed when a logout is detected.

When, for example, a logout of a user is detected, the authentication unit 121 reports the logout to the log transfer unit 127 (S501). The user logs out of the image forming apparatus 10 by, for example, removing the IC card 20 from the card reader-writer 18.

When receiving the report of the logout, the log transfer unit 127 obtains, from the local log storage unit 134, the entire log data of the logged-out user that is generated and stored in the local log storage unit 134 while the user is logged in the image forming apparatus 10 (S502, S503). When the local log storage unit 134 stores only log data that is generated while the user is logged in (for example, when the image forming apparatus 10 is configured such that information in the local log storage unit 134 is initialized each time a user logs out), the log transfer unit 127 may be configured to simply obtain the entire log data stored in the local log storage unit 134. On the other hand, when information in the local log storage unit 134 is not initialized, the local log storage unit 134 may contain log data of multiple users. In this case, log data may include a user name and date and time, and the log transfer unit 127 may be configured to obtain log data that includes the user name of the logged-out user and the date and time corresponding to a log-in period of the logged-out user.

Next, the log transfer unit 127 sends the user name of the logged-out user and the obtained log data (or sets of log data) to the upper limit management apparatus 30 (S504). Here, in a case where the log data includes a user name, the log transfer unit 127 may be configured to not send the user name separately.

The log reception unit 31 of the upper limit management apparatus 30 receives the user name and the log data. The log reception unit 31 stores the received log data in the log storage unit 35 in association with the user name (S505). Next, the log reception unit 31 requests the point updating unit 32 to update consumed points corresponding to the user name (S506). The point updating unit 32 calculates consumed points based on the log data (S507). The method of calculating consumed points at step S507 may be substantially the same as the method used at step S305 of FIG. 6. At step S507, however, point coefficients stored in the point coefficient storage unit 34 are used. Also, different from step S305 of FIG. 6 where consumed points for a one-side process are calculated, consumed points for one or more processes performed during a period after the user logs in and until the user logs out are calculated at step S507.

The point updating unit 32 updates consumed points that are stored in the user information storage unit 36 in association with the user name (S508). More specifically, the point updating unit 32 adds the consumed points calculated at step S507 to the consumed points stored in the user information storage unit 36.

Next, processes performed by the image forming apparatus 10 when the image forming apparatus 10 cannot communicate with the upper limit management apparatus 30 due to, for example, a network failure are described.

When communication with the upper limit management apparatus 30 is disabled, a process similar to the process of FIG. 3 is performed to authenticate a user. That is, when a communication failure between the image forming apparatus 10 and the upper limit management apparatus 30 is detected during a login process, the authentication unit 121 performs steps S150 through S170 of FIG. 3. The authentication unit 121 may be configured to detect a communication failure between the image forming apparatus 10 and the upper limit management apparatus 30 by sending a user search request at step S150, or by determining whether communication is possible before step S150.

The use limiting unit 125 of the image forming apparatus 10 performs a use limitation determining process that is substantially the same as the process described with reference to FIG. 15. Even when communication with the upper limit management apparatus 30 is not possible, the use limiting unit 125 can determine whether use limitation is necessary, because the point coefficients are stored in the local point coefficient storage unit 133 and the point upper limit and the consumed points of the logged-in user are stored, respectively, in the point upper limit storage unit 23 and the consumed point storage unit 21 of the IC card 20. Thus, when consumed points cannot be obtained from the upper limit management apparatus 30, the use limiting unit 125 uses consumed points stored in the IC card 20.

The process performed by the image forming apparatus 10 when a job is executed is substantially the same as the process described with reference to FIG. 6.

When communication between the image forming apparatus 10 and the upper limit management apparatus 30 is not possible, the steps following step S501 of FIG. 16 may not be performed even when the logout of a user is detected. In this case, after communication between the image forming apparatus 10 and the upper limit management apparatus 30 is restored, step S502 and subsequent steps may be performed for log data that is generated and stored in the local log storage unit 134 while communication is disabled. This makes it possible to update consumed points stored in the user information storage unit 36 of the upper limit management apparatus 30 to correct values. For example, the log transfer unit 127 may be configured to detect that the communication is restored. When transfer of log data at step S504 fails, the log transfer unit 127 monitors the status of communication between the image forming apparatus 10 and the upper limit management apparatus 30. The monitoring may be performed, for example, by sending a ping command to the upper limit management apparatus 30 at regular intervals. The log transfer unit 127 may be configured to resume step S502 and subsequent steps when communication with the upper limit management apparatus 30 is restored.

As described above, with the upper limit management system 1 of the second embodiment that includes the upper limit management apparatus 30 for centrally managing consumed points and point upper limits, it is possible to perform total upper limit management across multiple image forming apparatuses 10 using the IC cards 20 even when communication between the upper limit management apparatus 30 and the image forming apparatuses 10 is disabled.

In the second embodiment, the upper limit management apparatus 30 is an example of an information management apparatus. One set of consumed points and a point upper limit may be commonly used for multiple users. In this case, common consumed points are updated according to use of the image forming apparatus 10 by multiple users, and the necessity of use limitation is determined by comparing the common consumed points with a common point upper limit.

The above embodiments may also be applied to apparatuses and systems such as a projector, a video conference system, and a digital camera that are different from the image forming apparatus 10.

In the above embodiments, consumed points are an example of a first value that indicates consumption of units indicating a degree up to which an apparatus is usable. In other words, consumed points are an example of a first value indicating usage of an apparatus (i.e., how much the apparatus is used). The point upper limit may also be referred to as "maximum points". The point writing unit 181 is an example of a writing unit. The point writing unit 181, the point reading unit 182, or the card reader-writer 18 is an example of a detection unit. The upper limit management apparatus 30 of the second embodiment is an example of an information management apparatus. The authentication unit 121 is an example of an obtaining unit. Log data is an example of information indicating use of an apparatus. The log transfer unit 127 is an example of a transmission unit. Consumed points stored in the user information storage unit 36 are an example of a second value.

An aspect of this disclosure provides an apparatus, a use limiting method, and a storage medium that make it possible to perform total upper limit management across multiple apparatuses without using a network.

An apparatus, a use limiting method, and a storage medium according to embodiments of the present invention are described above. However, the present invention is not limited to the specifically disclosed embodiments, and variations and modifications may be made without departing from the scope of the present invention.

What is claimed is:

1. An apparatus, comprising:
   a memory that stores a program; and
   a processor that executes the program stored in the memory to perform a process including
   reading a first value indicating usage of a function from a portable storage medium that is carried by a user and set by the user on the apparatus,
   limiting use of the function of the apparatus based on the first value,
   writing an updated first value into the portable storage medium, the updated first value being obtained by updating the first value according to use of the function of the apparatus, and
   detecting a first event where the updated first value cannot be written into the portable storage medium, wherein when the first event is detected, the processor limits use of the function of the apparatus.

2. The apparatus as claimed in claim 1,
   wherein the process further includes detecting a second event where the first value cannot be read from the portable storage medium,
   wherein when one of the first and second events is detected, the processor limits use of the function of the apparatus.

3. The apparatus as claimed in claim 1, wherein the process further includes writing an initial value of the first value into the portable storage medium when the first value is read for a first time in each predetermined interval.

4. The apparatus as claimed in claim 1,
   wherein the process further includes
   obtaining a second value indicating usage of the function from an information management apparatus connected via a network to the apparatus,
   sending information indicating use of the function of the apparatus to the information management apparatus and requesting the information management apparatus to update the second value stored in the information management apparatus based on the information,
   when the second value is successfully obtained, updating the obtained second value according to use of the function of the apparatus, and limiting use of the function of the apparatus when the updated second value reaches a predetermined value, and
   writing the updated second value as the first value into the portable storage medium.

5. The apparatus as claimed in claim 4, wherein the process further includes
   when the second value is not successfully obtained, updating the read first value, and
   limiting use of the function of the apparatus when the first value reaches the predetermined value.

6. A method performed by an apparatus, the method comprising:
   causing a processor to execute
   reading a first value indicating usage a function from a portable storage medium that is carried by a user and set by the user on the apparatus;
   limiting use of the function of the apparatus based on the first value;
   writing an updated first value into the portable storage medium, the updated first value being obtained by updating the first value according to use of the function of the apparatus; and
   detecting a first event where the updated first value cannot be written into the portable storage medium,
   wherein when the first event is detected, the processor is caused to limit use of the function of the apparatus.

7. The method as claimed in claim 6, further comprising:
   causing the processor to execute detecting a second event where the first value cannot be read from the portable storage medium,
   wherein when one of the first and second events is detected, the processor is caused to limit use of the function of the apparatus.

8. The method as claimed in claim 6, further comprising: causing the processor to execute writing an initial value of the first value into the portable storage medium when the first value is read for a first time in each predetermined interval.

9. The method as claimed in claim 6, further comprising: causing the processor to execute
   obtaining a second value indicating usage of the function from an information management apparatus connected via a network to the apparatus;
   sending information indicating use of the function of the apparatus to the information management apparatus and requesting the information management apparatus to update the second value stored in the information management apparatus based on the information;
   when the second value is successfully obtained, updating the obtained second value according to use of the function of the apparatus, and limiting use of the function of the apparatus when the updated second value reaches a predetermined value; and
   writing the updated second value as the first value into the portable storage medium.

10. The method as claimed in claim 9, further comprising: causing the processor to execute
    when the second value is not successfully obtained, updating the read first value, and limiting use of the function of the apparatus when the first value reaches the predetermined value.

11. A non-transitory computer-readable storage medium storing a program for causing an apparatus to execute a process, the process comprising: causing the processor to execute
    reading a first value indicating usage of a function from a portable storage medium that is carried by a user and set by the user on the apparatus;
    limiting use of the function of the apparatus based on the first value; writing an updated first value into the portable storage medium, the updated first value being obtained by updating the first value according to use of the function of the apparatus; and
    detecting a first event where the updated first value cannot be written into the portable storage medium,
    wherein when the first event is detected, use of the function of the apparatus is limited.

12. The storage medium as claimed in claim 11, the process further comprising: causing the processor to execute
    detecting a second event where the first value cannot be read from the portable storage medium,
    wherein when one of the first and second events is detected, use of the function of the apparatus is limited.

13. The storage medium as claimed in claim 11, the process further comprising: causing the processor to execute
    writing an initial value of the first value into the portable storage medium when the first value is read for a first time in each predetermined interval.

14. The storage medium as claimed in claim 11, the process further comprising: causing the processor to execute
    obtaining a second value indicating usage of the function from an information management apparatus connected via a network to the apparatus;

sending information indicating use of the function of the apparatus to the information management apparatus and requesting the information management apparatus to update the second value stored in the information management apparatus based on the information;
when the second value is successfully obtained, updating the obtained second value according to use of the function of the apparatus, and limiting use of the function of the apparatus when the updated second value reaches a predetermined value; and
writing the updated second value as the first value into the portable storage medium.

15. The storage medium as claimed in claim 14, the process further comprising: causing the processor to execute
when the second value is not successfully obtained, updating the read first value, and limiting use of the function of the apparatus when the first value reaches the predetermined value.

* * * * *